United States Patent Office 2,934,966
Patented May 3, 1960

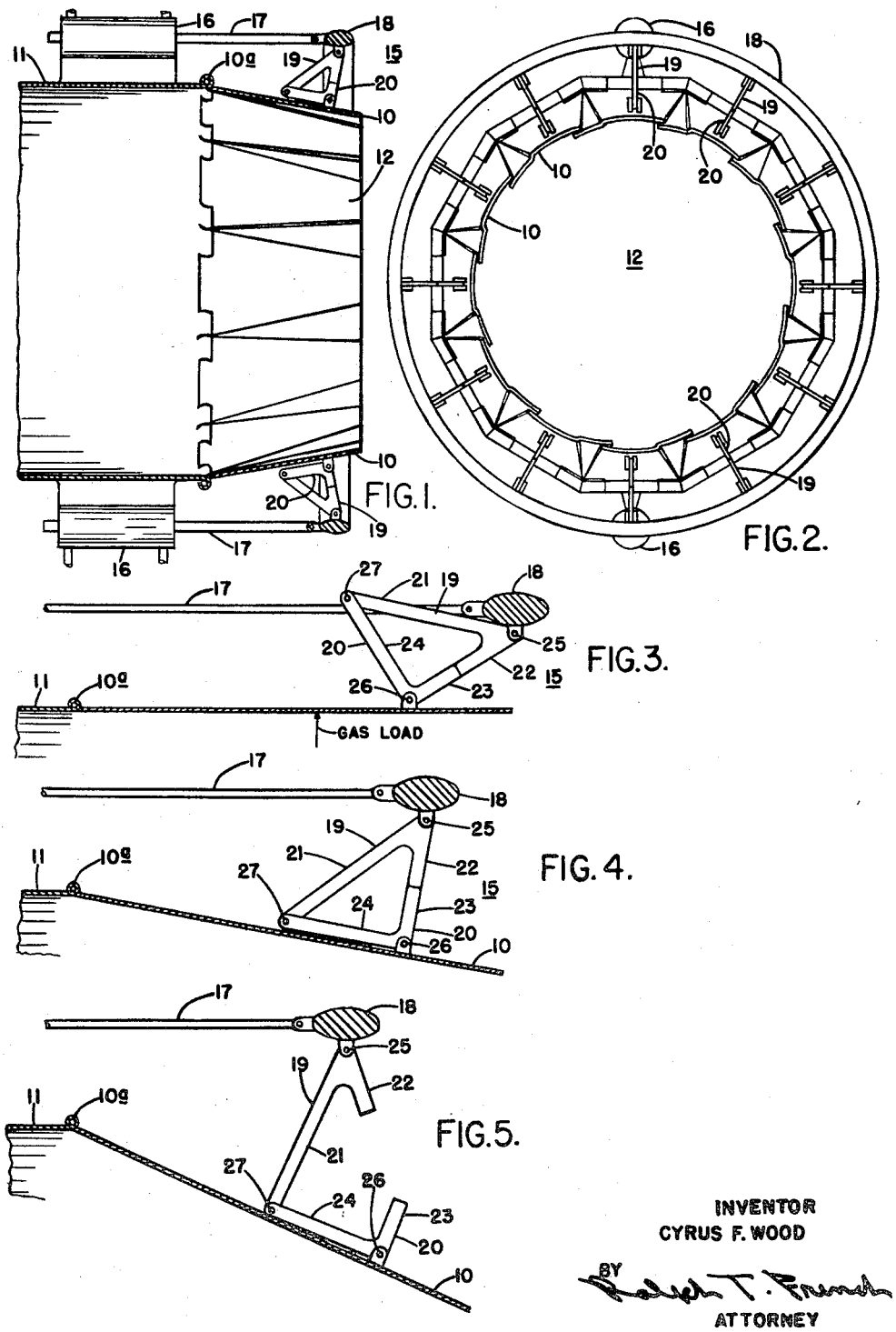

2,934,966
CONTROL APPARATUS

Cyrus F. Wood, Kansas City, Mo., assignor to Westinghouse Electric Corporation, East Pittsburgh, Pa., a corporation of Pennsylvania Application November 12, 1957, Serial No. 695,772

6 Claims. (Cl. 74—105)

This invention relates to a mechanical movement, more particularly to a mechanical movement employing levers for transmitting motion from a reciprocable driving mechanism to a driven mechanism and has for an object to provide an improved arrangement of this type.

It is a further object of the invention to provide a mechanical movement employing levers for transmitting motion from a reciprocable driving mechanism to a driven mechanism in which the driven mechanism is movable in a direction transverse to the direction of movement of the driving mechanism.

Another object is to provide a mechanical movement employing levers for moving a driven member with a camming action, yet having a greater mechanical efficiency than cam structure with substantially no increase in head room or clearance for the levers.

A more specific object of the invention is to provide a highly improved and effective linkage structure for positioning a variable area exhaust nozzle structure for a jet propulsion engine.

Briefly, in accordance with the invention there is provided a linkage structure for transmitting motion from a reciprocable driving mechanism to a driven mechanism movable in a direction transverse to that of the driving mechanism. The linkage structure includes a pair of V-shaped levers disposed in inverted juxtaposition with each other and pivotally attached to each other adjacent the ends of one pair of their legs with the ends of their other pair of legs disposed in abuttable alignment with each other. One of the levers is pivotally connected adjacent its apex to the driving mechanism and, in a similar manner, the other lever is pivotally connected adjacent its apex to the driven mechanism.

In operation, during one portion of travel of the driving mechanism, the two levers are jointly rotatable as a unit about the pivotal connection with the driven mechanism, thereby exerting a camming force on the driven mechanism. During another portion of travel, movement of the lever attached to the driven mechanism is arrested. However, the other lever continues to rotate independently to exert a continuing camming force on the driven mechanism.

In the example illustrated, the above described mechanical movement is embodied in a variable area exhaust nozzle structure for a jet propulsion engine, which structure includes an annular array of hinged overlapping leaf members movable jointly to modify the exhaust outlet of the engine. In this arrangement, linkage of the above described type is provided for actuating each of the leaf members and the movement of the reciprocating driving mechanism is transmitted uniformly to each linkage structure by a common actuating or unison ring.

The foregoing and other objects are effected by the invention as will be apparent from the following description and claims taken in connection with the accompanying drawings, forming a part of this application, in which:

Fig. 1 is an axial sectional view of a variable area exhaust nozzle structure for a jet propulsion engine having the invention incorporated therein;

Fig. 2 is an end view of the structure shown in Fig. 1; and

Figs. 3, 4 and 5 are enlarged fragmentary views illustrating the exhaust nozzle structure shown in Fig. 1, in different operating positions.

Referring to the drawing in detail, there is shown a variable area exhaust nozzle structure for a jet engine having an annular array of leaves 10 hingedly connected at 10a to a cylindrical exhaust casing 11 of an aviation jet propulsion engine (not shown). As well known in the art, the hot combustion gases formed within the engine are delivered through the exhaust casing 11 to the external ambient atmosphere by way of the exhaust outlet 12, formed by the leaves 10, in the form of a jet to provide a propulsive thrust to the engine. During such operation it is desirable to modulate the area of the exhaust outlet 12 for optimum performance of the engine.

In accordance with the invention, the leaves 10 are jointly positioned by a mechanical movement, generally designated 15, including a pair of reciprocable driving mechanisms or actuators 16 attached to the casing 11 in diametrically opposed relation to each other. The driving mechanisms may be identical and are each provided with reciprocal rods 17 movable in fore and aft direction parallel to the axis of the exhaust casing 11. The rods 17 are further hingedly attached at their ends to a unison ring or actuator ring 18 surrounding the array of leaves 10 and connected to each of the leaves by duplicate radially extending linkage structure including a first lever 19 and a second lever 20. The unison ring 18 transmits the movement of the actuators 16 uniformly to each of the leaves 10, hence only one set of levers 19 and 20 and their associated leaf 10 will be considered.

The levers 19 and 20 are of generally V-shape and are disposed in inverted juxtaposed relation with each other to form a triangle. The lever 19 has an elongated leg 21 forming one side of the triangle and a short leg 22 which together with a short leg 23 of the other lever form a second side of the triangle. The lever 20 further has an elongated leg 24 which forms the third side of the triangle. The lever 19 is attached adjacent its apex to the unison ring 18 by a pin 25 and in a similar manner the lever 20 is attached adjacent its apex to an associated leaf 10 by a pin 26. The levers 19 and 20 are pivotally attached to each other adjacent the ends of the legs 21 and 24 by a pin 27. Thus, as illustrated, the levers are rockably disposed intermediate the unison ring 18 and the leaf 10.

With exhaust nozzle apparatus of the above type, the leaves 10 are forced outwardly by the gas load imposed thereon by the pressure of the exhaust gases, so that no biasing means is essential. Accordingly, the leaves exert a force on the levers 19 and 20 during all conditions of operation of the engine to assure that they assume the maximum open position permitted by the levers. Hence, the levers are constantly urged toward the unison ring 18 and towards each other.

As illustrated in Fig. 3, the mechanical movement 15 is positioned so that the leaf is retained in its outermost position by the gas load. Accordingly, the area of the exhaust outlet 12 is at its maximum value. In this position the actuator rod 17 is disposed at its maximum extended position and the levers 19 and 20 are so positioned by the unison ring 18 that their short legs 22 and 23 are in biased abutment with each other. To move the leaf inwardly against the gas load, the actuator rod 17 is retracted, thereby moving the unison ring 18 to the left as seen in the drawings and exerting a compressive force on the short lever legs 22 and 23, causing the levers to rotate jointly as a unit in a counterclockwise direction about the pin 26 with a camming action on the leaf. As the levers rotate in the manner outlined above, they eventually assume a position in which, as shown in Fig. 4, further movement of the lever 20 is arrested by abutment of its leg 20 with the leaf. However, as the rod 17 is further retracted, the leg 21 of the lever 19 is subjected to a compressive force, thereby causing the lever 19 to continue its rotation alone about the pin 27, thereby exerting a continuing camming force on the leaf. During such latter movement, the levers begin to separate until finally at the maximum closed position of the leaf the levers assume the positions shown in Fig. 5.

When it is desired to increase the area of the exhaust outlet 12, the actuators 16 are actuated to extend their rods 17, thereby moving the unison ring 18 to the right as seen in the drawings. During such operation the movement of the levers 19 and 20 is reversed. That is, the lever 19 rotates about its pivot pins 25 and 27 in clockwise direction while the other lever remains stationary until the lever 19 assumes the position shown in Fig. 4, in which further motion is arrested by abutment of its short leg 22 with leg 23. Thereafter, the levers rotate in unison in the same direction about the pivot pins 25 and 26 until they assume the final position shown in Fig. 3, with the leaf 10 in the fully opened position.

As seen in Fig. 4, the levers are formed in such a manner that the leg 19 is longer than any of the other legs, particularly the sum of the legs 22 and 23, so that, as the levers rotate from the position shown in Fig. 3 to Fig. 4, the legs 22 and 23 are effective to move the leaf 10 with a camming action through a first range which is ended when they assume a position normal to the leaf. From thence on, the longer leg 21 is effective to continue movement of the leaf with a caming action until it assumes a position normal to the leaf as shown in Fig. 5.

It will now be seen that the invention provides a simple mechanical movement arrangement employing levers for transmitting motion from a driving mechanism, with a simple yet effective camming action, to a driven mechanism movable in a direction transverse to the direction of the movement of the driving mechanism.

It will also be seen that the invention provides a linkage arrangement which operates in somewhat the same manner as a cam but in which the friction losses incident thereto are considerably minimized.

It will further be seen that the invention provides a linkage arrangement highly suitable for positioning a variable area exhaust nozzle for a jet engine, since the maximum head room necessary for the linkage is maintained at a minimum value. In this connection it will be noted that the levers are formed and operate in such a manner that they never extend beyond the outer periphery of the ring 18 regardless of the position of the leaves. This is a highly desirable feature in aviation engines since the shrouding (not shown) may be maintained at a minimum diameter consistent with sound aerodynamic design practice.

While the invention has been shown in but one form, it will be obvious to those skilled in the art that it is not so limited, but is susceptible of various changes and modifications without departing from the spirit thereof.

What is claimed is:

1. In a mechanical movement, the combination comprising a reciprocating driving mechanism and a driven mechanism movable in a direction transverse to that of said driving mechanism, said driving mechanism including a reciprocable rod, means for supporting said rod against the reaction force of said driven mechanism, a first lever pivotally connected intermediate its end portions to said driving mechanism, and a second lever pivotally connected intermediate its end portions to said driven mechanism, said first and second levers being pivotally connected to each other adjacent one of their end portions and having their other end portions disposed in abuttable end-to-end relation with each other, and one of said levers having a portion movable into and out of abutment with one of said mechanisms.

2. In a mechanical movement, the combination comprising a reciprocating driving mechanism including a reciprocable rod and a driven mechanism movable in a direction transverse to that of said driving mechanism, means for supporting said rod against the reaction force of said driven mechanism, a first lever pivotally connected at one portion to said driving mechanism, and a second lever pivotally connected at one portion to said driven mechanism, said first and second levers being pivoted to each other adjacent one of their end portions and having their opposite end portions disposed in abutting end-to-end relation with each other, said pivotal connections being disposed at the apices of a triangle, said first and second levers being disposed in end-to-end abutment and jointly movable during a portion of the travel of said driving mechanism, said first lever being disposed out of abutment with and movable relative to said second lever during another portion of travel of said driving mechanism, and said second lever having a portion disposed out of abutment with said driven mechanism during said first-mentioned portion of travel and disposed in abutment with said driven mechanism during said second-mentioned portion of travel.

3. In a mechanical movement, the combination comprising a reciprocating driving mechanism including a reciprocable rod and a driven mechanism movable through a first and a second range of travel in a direction transverse to that of said driving mechanism, means for supporting said rod against the reaction force of said driven mechanism, a linkage structure comprising first and second levers pivotally connected to each other adjacent one of their end portions and having opposite end portions, said end portions being mutually abuttable end-to-end, said first lever being pivoted to the rod of said driving mechanism, said second lever being pivoted to said driven mechanism, said linkage structure being rotatable as a unit during a portion of the travel of said reciprocable rod with said abuttable end portions in compressive abutment and moving said driven mechanism through said first range of travel, and said first lever being rotatable about its pivoted end portion during another portion of travel of said reciprocable rod and moving said driven mechanism through said second range of travel.

4. In a mechanical movement, the combination comprising a reciprocating driving mechanism including a reciprocable rod, a driven mechanism movable in a direction transverse to that of said rod, means for supporting said rod against the reaction force of said driven mechanism, and a linkage structure interposed between said mechanisms, said linkage structure including a first lever pivotally connected at one portion to said rod, and a second lever pivotally connected at one portion to said driven mechanism, said first and second levers being pivotally connected to each other adjacent one of their end portions and having their opposite end portions disposed in abutting end-to-end relation with each other, said pivotal connections being disposed at the apices of a triangle, said opposite end portions being urged toward each other during a portion of the travel of said rod to effect joint movement of said first and second levers and a following movement of said driven mechanism, said second lever being movable into abutment with said driven mechanism and said opposite end portions being urged away from each other during another portion of travel of said rod to effect movement of said first lever relative to said second lever and continuing following movement of said driven mechanism.

5. In combination, a driven mechanism, a driving mechanism having a rod reciprocable in a direction transverse to the movement of said driven mechanism, a linkage structure for transmitting the movement of said rod to said driven mechanism, means for supporting said rod against the reaction force of said driven mechanism, said linkage structure including a first V-shaped lever and a second V-shaped lever, said first lever being pivotally connected adjacent its apex to said rod, said second lever being pivotally connected adjacent its apex to said driven mechanism, said levers having a first pair of juxtaposed end portions pivotally connected to each other and a second pair of juxtaposed end portions disposed in abuttable end-to-end alignment with each other, and said second lever being movable into and out of abutment with said driven mechanism.

6. In a mechanical movement, the combination comprising a driving mechanism having a reciprocating rod, a driven mechanism movable in a direction transverse to that of said rod, means for supporting said rod against the reaction force of said driven mechanism, and a linkage structure for transmitting the movement of said rod to said mechanism, said linkage structure including a first V-shaped lever and a second V-shaped lever, said first lever being pivotally connected adjacent its apex to said rod, said second lever being pivotally connected adjacent its apex to said driven mechanism, said levers having a first pair of juxtaposed leg portions pivotally connected to each other and a second pair of leg portions, said second pair of leg portions being movable into compressive end-to-end abutment with each other and jointly movable during a portion of the travel of said rod to move said driven mechanism, the first leg of said first lever being movable during another portion of the travel of said rod into compressive abutment with said driven mechanism to move the latter with a continuing motion and said second pair of leg portions being movable concomitantly out of abutment with each other.

References Cited in the file of this patent

UNITED STATES PATENTS

| | | |
|---|---|---|
| 1,387,364 | Dever | Aug. 9, 1921 |
| 2,682,147 | Ferris | June 29, 1954 |
| 2,813,395 | Meyer | Nov. 19, 1957 |